United States Patent
Kikuchi

(10) Patent No.: US 9,229,558 B2
(45) Date of Patent: Jan. 5, 2016

(54) METHOD OF MANUFACTURING TOUCH PANEL AND TOUCH PANEL

(71) Applicant: FUJITSU COMPONENT LIMITED, Tokyo (JP)

(72) Inventor: Maiko Kikuchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 244 days.

(21) Appl. No.: 13/945,001

(22) Filed: Jul. 18, 2013

(65) Prior Publication Data

US 2014/0030492 A1   Jan. 30, 2014

(30) Foreign Application Priority Data

Jul. 24, 2012   (JP) ................. 2012-164041

(51) Int. Cl.
| | |
|---|---|
| *G06F 3/041* | (2006.01) |
| *G06F 3/044* | (2006.01) |
| *G06F 3/045* | (2006.01) |

(52) U.S. Cl.
CPC ............. *G06F 3/041* (2013.01); *G06F 3/044* (2013.01); *G06F 3/045* (2013.01); *G06F 2203/04103* (2013.01); *Y10T 428/24793* (2015.01)

(58) Field of Classification Search
CPC ............. Y10T 428/24777; Y10T 428/24793; G06F 3/041; G06F 3/044; G06F 3/045
See application file for complete search history.

(56) References Cited

U.S. PATENT DOCUMENTS

| 7,554,624 B2 | 6/2009 | Kusuda et al. |
| 8,279,188 B2 | 10/2012 | Kusuda et al. |

FOREIGN PATENT DOCUMENTS

| JP | 2008-102512 | 5/2008 |
| JP | 2010-117903 | 5/2010 |
| JP | 2011-170726 | 9/2011 |
| WO | WO2008/081710 | 7/2008 |

OTHER PUBLICATIONS

Machine translation of JP 2010-117903 acquired on May 7, 2015.*
Machine translation of JP 2011-170726 acquired on May 7, 2015.*

* cited by examiner

*Primary Examiner* — Gerard Higgins
(74) *Attorney, Agent, or Firm* — IPUSA, PLLC

(57) ABSTRACT

A method of manufacturing a touch panel, includes forming a print layer on a peripheral portion of a surface of a touch panel body portion; coating resin on the surface of the touch panel body portion on which the print layer is formed and, after coating, curing the resin to form a resin layer; and adhering an optical clear adhesive sheet on a surface of a cover film and further adhering the surface of the cover film, at which the optical clear adhesive sheet is adhered to, to the surface of the touch panel body portion at which the resin layer is adhered to.

2 Claims, 3 Drawing Sheets

METHOD OF MANUFACTURING TOUCH PANEL AND TOUCH PANEL

BACKGROUND OF THE INVENTION

1. Field of the Invention

The present invention relates to a method of manufacturing a touch panel and a touch panel.

2. Description of the Related Art

Touch panels are input devices capable of directly inputting data through a display and usually provided at a front surface of the display. A user can directly input data based on information visually recognized by viewing the display through the touch panel, so that the touch panel is used in various ways.

As such touch panels, resistive touch panels and capacitive touch panels are widely known. For the resistive touch panel, transparent conductive layers are respectively formed on an upper conductive substrate and on a lower conductive substrate, and the upper conductive substrate and the lower conductive substrate are stacked such that the transparent conductive layers are positioned to face each other. When force is applied to a point of the upper conductive substrate, the transparent conductive layers of the upper conductive substrate and the lower conductive substrate contact at that point so that a coordinate position of the pushed point can be detected. For the capacitive touch panel, a position is detected by detecting a current flowing through a transparent electrode or the like of the touch panel when a finger or the like contacts the touch panel.

Generally, a cover film provided with a print layer, which becomes a decorating layer, at a peripheral portion is adhered to a surface of the touch panel.

However, as will be explained later in detail, when the print layer is provided at the peripheral portion, there is a step between an area where the print layer is formed and an area where the print layer is not formed, which results in air bubbles being generated at an interface. When such air bubbles are generated, a bad effect may be caused on visibility or quality of the touch panel, or further, such a touch panel becomes defective.

PATENT DOCUMENTS

[Patent Document 1] Japanese Laid-open Patent Publication No. 2010-117903
[Patent Document 2] Japanese Laid-open Patent Publication No. 2011-170726
[Patent Document 3] International Patent Publication No. 2008/081710
[Patent Document 4] Japanese Laid-open Patent Publication No. 2008-102512

SUMMARY

According to an embodiment, there is provided a method of manufacturing a touch panel including forming a (colored) print layer on a peripheral portion of a surface of a touch panel body portion; coating resin (ultraviolet curable resin or thermoset resin) on the surface of the touch panel body portion on which the print layer is formed and, after coating, curing (irradiating ultraviolet light or heating, respectively,) the resin to form a resin layer; and adhering an optical clear adhesive sheet on a surface of a cover film and further adhering the surface of the cover film, at which the optical clear adhesive sheet is adhered to, to the surface of the touch panel body portion at which the resin layer is adhered to.

According to another embodiment, there is provided a method of manufacturing a touch panel including forming a (colored) print layer on a peripheral portion of a surface of a touch panel body portion; coating ultraviolet curable resin on the surface of the touch panel body portion at which the print layer is formed; mounting a cover film on the resin coated on the touch panel body portion; and irradiating ultraviolet light after the cover film is mounted on the resin material.

According to another embodiment, there is provided a touch panel including a touch panel body portion; a (colored) print layer formed on a peripheral portion of a surface of the touch panel body portion; a resin layer formed by cured resin (ultraviolet curable resin or thermoset resin), formed on the touch panel body portion; an optical clear adhesive sheet formed on the resin layer; and a cover film formed on the optical clear adhesive sheet.

Note that also arbitrary combinations of the above-described elements, and any changes of expressions in the present invention, made among methods, devices and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DESCRIPTION OF EMBODIMENTS

Before describing the present invention, a general method of manufacturing a touch panel to which such a cover film is adhered is explained with reference to FIG. 1A to FIG. 4D in order to facilitate the understanding of the present invention.

Figure 1A:
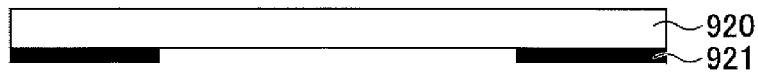
FIG. 1A to FIG. 1D are cross-sectional views illustrating a general method of manufacturing a touch panel.

First, as illustrated in FIG. 1A, a print layer 921, which becomes a decorating layer, is formed at a peripheral portion of a cover film 920 formed by a clear resin material or the like capable of transmitting light, by a screen printing or the like. The print layer 921 is formed by a colored coating or the like such as black or the like, and the thickness of the print layer 921 is about 10 μm.

Figure 1B:
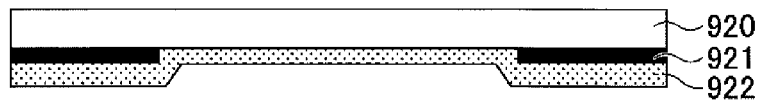

Then, as illustrated in FIG. 1B, an optical clear adhesive (OCA) sheet 922 is adhered to a surface of the cover film 920 at which the print layer 921 is formed.

Figure 1C:
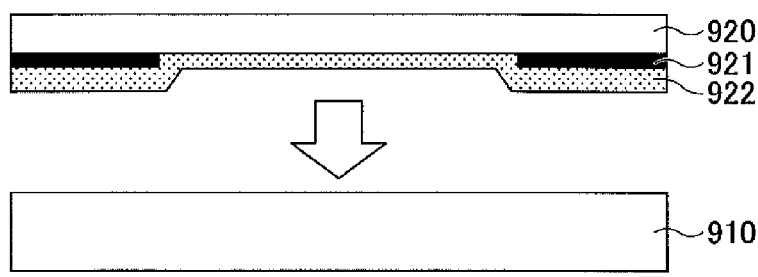

Then, as illustrated in FIG. 1C, the surface of the cover film 920 at which the OCA sheet 922 is adhered is adhered to a touch panel body portion 910. The touch panel body portion 910 is a structure in which two transparent substrates are adhered for a resistive touch panel, for example. Alternatively, the touch panel body portion 910 may be a structure for a capacitive touch panel.

Figure 1D:
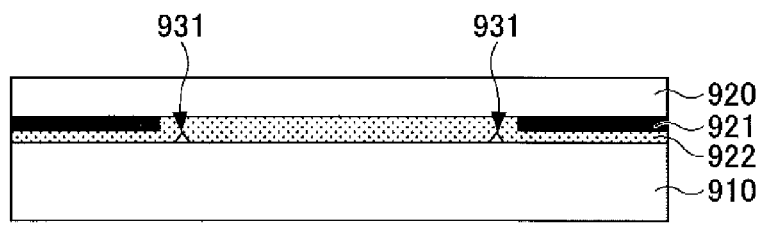

Thus, as illustrated in FIG. 1D, the cover film 920 can be adhered to the touch panel body portion 910 via the OCA sheet 922. With this configuration, a touch panel is manufactured in which the print layer 921 is formed at the peripheral portion and the cover film 920 is adhered to the touch panel body portion 910.

Here, according to the above described method of manufacturing a touch panel, as the print layer 921 is provided at the peripheral portion of the cover film 920, there is a step between an area where the print layer 921 is formed and an area where the print layer 921 is not formed. Thus, air bubbles 931 are generated at an interface between the area where the print layer 921 is formed and the area where the print layer 921 is not formed because a material composing the OCA sheet 922 cannot be sufficiently provided to the interface, when the cover film 920 is adhered to the touch panel body portion 910 via the OCA sheet 922. When such air bubbles 931 are generated, a bad effect may be caused on visibility or quality of the touch panel, or further, such a touch panel becomes defective.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(First Embodiment)

A method of manufacturing a touch panel of the first embodiment is explained with reference to FIG. 2A to FIG. 2D.

Figure 2A:
FIG. 2A to FIG. 2D are cross-sectional views illustrating a method of manufacturing a touch panel of a first embodiment.

First, as illustrated in FIG. 2A, a print layer 11, which becomes a decorating layer, is formed on a peripheral portion of one of the surfaces of a touch panel body portion 10 by a screen printing or the like. The print layer 11 is formed by a colored coating or the like such as black or the like, and the thickness of the formed print layer 11 is about 10 μm. The touch panel body portion 10 is a structure in which two transparent substrates are adhered for a resistive touch panel, for example. Specifically, the touch panel body portion 10 may be a structure in which a transparent substrate with a thickness about 1.1 mm and a clear film with a thickness about 188 μm are bonded by a double sided tape with a thickness of about 60 μm, or the like. The touch panel body portion 10 may be a capacitive touch panel.

Figure 2B:
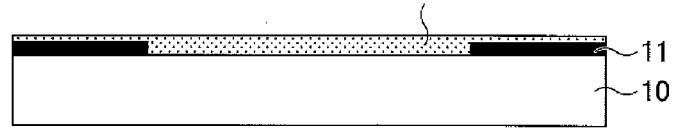

Then, as illustrated in FIG. 2B, ultraviolet curable resin is coated on the surface of the touch panel body portion 10 at which the print layer 11 is formed. Subsequently, the ultraviolet curable resin is cured by irradiating ultraviolet light to form a resin layer 12. The resin layer 12 thus formed is transparent to light. As the ultraviolet curable resin right after it is coated is liquid, the ultraviolet curable resin can fill a step between an area where the print layer 11 is formed and an area where the print layer 11 is not formed to flatten the surface of the resin layer 12. As the ultraviolet curable resin to form the resin layer 12, for example, a functional sheet type adhesive agent TB1630 (manufactured by ThreeBond Co., Ltd.), ultraviolet cure type sealing material KER-4000-UV (manufactured by Shin-Etsu Chemical Co., Ltd.) or the like is exemplified. Further, although a case where the ultraviolet curable resin is used to form the resin layer 12 is explained, thermoset resin or the like may be used provided that the formed resin layer 12 becomes transparent to light. At this time, by heating and curing the thermoset resin after it is coated, the resin layer 12 can be formed.

Figure 2C:
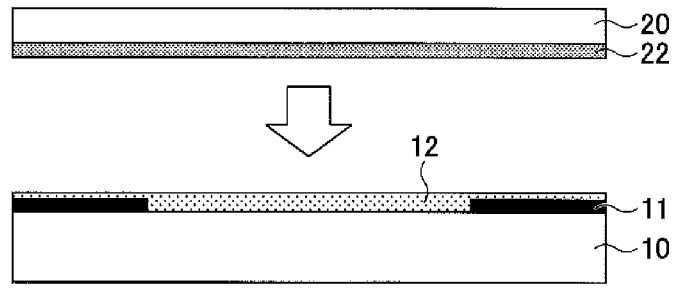

Then, as illustrated in FIG. 2C, an OCA sheet 22 is adhered to a cover film 20 and the surface of the cover film 20 at which the OCA sheet 22 is adhered is adhered to the surface of the touch panel body portion 10 at which the resin layer 12 is formed. The cover film 20 is a clear film made of a resin material with a thickness of about 188 μm, for example. Specifically, the cover film 20 may be formed by a Polyethylene terephthalate (PET) film or the like. As the OCA sheet 22, DAITAC ZB7012W (manufactured by DIC cooperation) or the like may be exemplified.

Figure 2D:
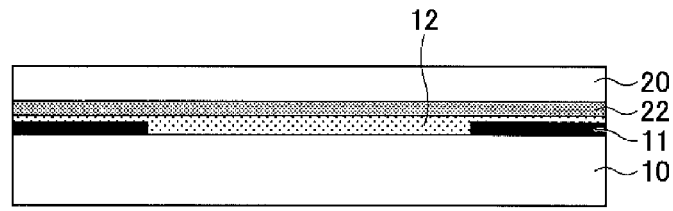

With this, as illustrated in FIG. 2D, the cover film 20 is adhered to the touch panel body portion 10 via the resin layer 12 formed by the ultraviolet curable resin or the like and the OCA sheet 22. As such, in this embodiment, a touch panel having a structure in which the print layer 11 is formed at the peripheral portion and the cover film 20 is adhered to the touch panel body portion 10 can be easily manufactured.

In this embodiment, in the process illustrated in FIG. 2B, the surface of the touch panel body portion 10 at which the print layer 11 is formed is covered by the resin layer 12 and the surface of the resin layer 12 is formed to be flat. Thus, when adhering the flat cover film 20 via the OCA sheet 22, air bubbles or the like are not generated.

Further, in this embodiment, as the cover film 20 is adhered to the touch panel body portion 10 via the OCA sheet 22, even when a contaminant is sandwiched between the cover film 20 and the touch panel body portion 10 in manufacturing process of the touch panel, the cover film 20 can be removed from the touch panel body portion 10 and the contaminant sandwiched between the cover film 20 and the touch panel body portion 10 can be easily removed. The touch panel body portion 10 and the cover film 20 can be used after removing the contaminant and thus, lowering of the yield of manufactured touch panels can be suppressed.

(Second Embodiment)

A method of manufacturing a touch panel of the second embodiment is explained with reference to FIG. 3A to FIG. 3D.

Figure 3A:
FIG. 3A to FIG. 3D are cross-sectional views illustrating a method of manufacturing a touch panel of a second embodiment.

First, as illustrated in FIG. 3A, a print layer 11, which becomes a decorating layer, is formed on a peripheral portion of one of the surfaces of a touch panel body portion 10 by a screen printing or the like. The print layer 11 is formed by a colored coating or the like such as black or the like, and the thickness of the formed print layer 11 is about 10 μm. The touch panel body portion 10 is a structure in which two transparent substrates are adhered for a resistive touch panel, for example. Specifically, the touch panel body portion 10 may be a structure in which a transparent substrate with a thickness about 1.1 mm and a clear film with a thickness about 188 μm are bonded by a double sided tape with a thickness of about 60 μm, or the like. The touch panel body portion 10 may be a capacitive touch panel.

Figure 3B:
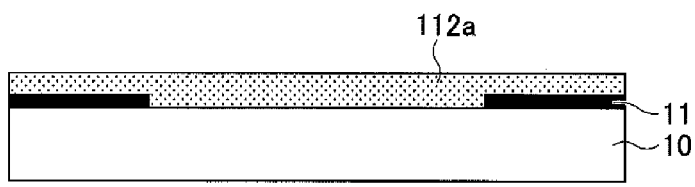

Then, as illustrated in FIG. 3B, optic elasticity resin 112a is coated on the surface of the touch panel body portion 10 at which the print layer 11 is formed. As the optic elasticity resin right after it is coated is liquid, the optic elasticity resin can fill a step between an area where the print layer 11 is formed. The optic elasticity resin 112a is a material which can transmit light and has elasticity when cured by irradiating ultraviolet light. Thus, in particular, the optic elasticity resin is preferably used when the touch panel body portion 10 is the resistive touch panel. As the optic elasticity resin 112a, optic elasticity resin (SVR)(manufactured by Sony Chemical & Information Device Cooperation) or the like may be used, for example.

Figure 3C:
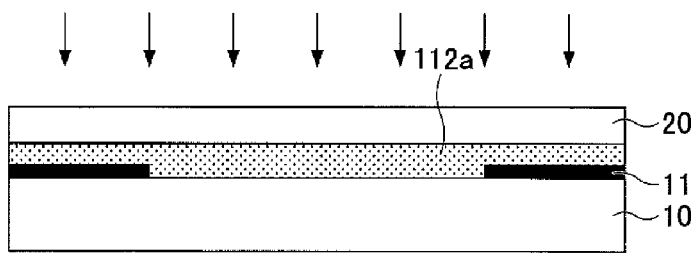

Then, as illustrated in FIG. 3C, after mounting the cover film 20 on the optic elasticity resin 112a, ultraviolet light is irradiated. With this, the optic elasticity resin 112a is cured so that the optic elasticity resin layer 112 is formed. At this time, the cover film 20 is adhered to the optic elasticity resin layer 112. The cover film 20 is formed by a clear film made of a resin material with a thickness of about 188 μm, and specifically, formed by a PET film or the like.

Figure 3D:
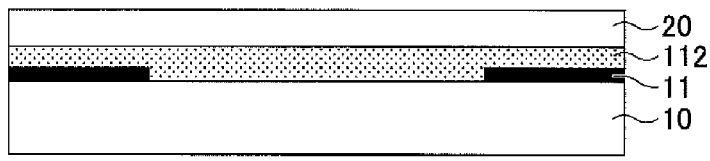

With this, as illustrated in FIG. 3D, the cover film 20 can be adhered to the touch panel body portion 10 via the optic elasticity resin layer 112. As such, in this embodiment, a touch panel having a structure in which the print layer 11 is formed at the peripheral portion and the cover film 20 is adhered to the touch panel body portion 10 can be easily manufactured.

In this embodiment, in the process shown in FIG. 3B, the surface of the touch panel body portion 10 at which the print layer 11 is formed is covered by the liquid optic elasticity resin 112*a*. Thus, the optic elasticity resin layer 112 formed by curing the optic elasticity resin 112*a* is formed in accordance with the shape of the cover film 20. Thus, air bubbles or the like are not generated when adhering the cover film 20.

The structures or operations other than those described are the same as those of the first embodiment.

According to the embodiment, a touch panel in which a print layer is formed at a peripheral portion and a cover film is adhered to can be manufactured without generating air bubbles or the like.

Although a preferred embodiment of the method of manufacturing a touch panel and the touch panel has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

The present application is based on and claims the benefit of priority of Japanese Priority Application No. 2012-164041 filed on Jul. 24, 2012, the entire contents of which are hereby incorporated by reference.

What is claimed is:

1. A method of manufacturing a touch panel, comprising:
   forming a print layer on a peripheral portion of a surface of a touch panel body portion;
   coating resin on the surface of the touch panel body portion on which the print layer was formed and, after coating, curing the resin to form a resin layer; and
   adhering an optically clear adhesive sheet on a surface of a cover film and further adhering the surface of the cover film, on which the optically clear adhesive sheet was adhered to, to the surface of the touch panel body portion on which the resin layer was formed.

2. The method of manufacturing a touch panel according to claim 1, wherein the touch panel body portion is a resistive touch panel or a capacitive touch panel.

\* \* \* \* \*